United States Patent Office 3,808,263
Patented Apr. 30, 1974

3,808,263
6,6-DIMETHYL-9-ALKYL-9-AZABICYCLO[3.3.1] NONAN-3-OLS
Naoto Yoneda, Teruo Ishihara, Yasuzo Kondo, and Tetsuji Kobayashi, Osaka, Kentaro Okumura, Kobe, Michio Kojima, Nara, and Hajime Tamaki, Urawa, Japan, assignors to Tanabe Seiyaku Co., Ltd., Osaka, Japan
No Drawing. Filed Apr. 28, 1971, Ser. No. 138,361
Claims priority, application Japan, May 12, 1970, 45/40,262; Jan. 21, 1971, 46/1,874
Int. Cl. C07d 39/00
U.S. Cl. 260—293.54          7 Claims

ABSTRACT OF THE DISCLOSURE

A tertiary amino compound of the formula

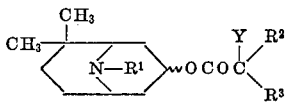

wherein $R^1$ is lower alkyl, each of $R^2$ and $R^3$ is phenyl or thienyl and Y is hydrogen, hydroxy or lower alkanoyloxy, is reacted with a compound of the formula $R^4-X$, wherein $R^4$ is lower alkyl and X is an acid residue of a pharmaceutically acceptable acid. Quaternary ammonium compounds of the formula

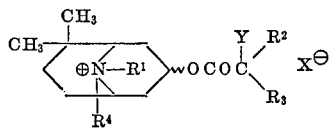

wherein $R^1$, $R^2$, $R^3$, $R^4$, Y and X are as defined above, are produced. These compounds exhibit potent peripheral anticholinergic activity and are substantially free from central anticholinergic activity. 6,6,9,9-tetramethyl-9-azoniabicyclo[3.3.1]nonane - 3-alpha (or 3-beta)-yl, alpha, alpha-di(2-thienyl)glycolate iodide and 6,6,9,9-tetramethyl-9 - azoniabicyclo[3.3.1]nonane - 3-alpha-yl alpha,alpha-diphenyl-glycolate iodide are preferred.

This invention relates to novel derivatives of 6,6-dimethyl-9-lower alkyl-9-azabicyclo[3.3.1]nonan-3α and/or 3β-ol and a process for preparing same.

The 6,6-dimethyl-9-lower alkyl-9 - azabicyclo[3.3.1] nonan-3α and/or 3β-ol derivatives of the present invention are represented by the formula:

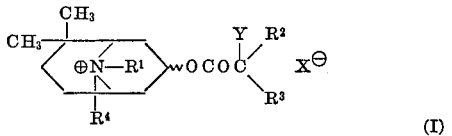

wherein $R^1$ and $R^4$ are lower alkyl radicals, each of $R^2$ and $R^3$ is phenyl or thienyl radical, Y is hydrogen atom, hydroxy radical or a lower alkanoyloxy radical and X is an anionic residue of a pharmaceutically acceptable acid.

We have now found that the quaternary ammonium compounds (I) of the present invention are useful as anti-spasmodics and/or anti-ulcer agents. The compounds of the present invention are characterized by their potent peripheral anti-cholinergic activity. In particular, the glycolate-type compounds of the present invention, wherein Y is hydroxy radical, have the most potent antispasmodic and anti-ulcer activity. For instance, 6,6,9,9-tetramethyl-9 - azoniabicyclo[3.3.1]non-3α-yl α,α-di(2-thienyl)glycolate iodide exhibits an anti-cholinergic activity about 22 times that of scopolamine butylbromide. When examined using isolated guiena-pig ileum, the anticholinergic activity ($ED_{50}$) of the compound which would suppress 50% of acetylcholine-induced contractions was $2.2 \times 10^{-9}$ g./ml., while $ED_{50}$ of scopolamine butylbromide was $4.8 \times 10^{-8}$ g./ml. Moreover, when male mice are immersed for 16 hours to the depth of their xiphoid in water (24° C.) after the subcutaneous injection of a test compound, the anti-ulcer activity of 6,6,9,9-tetramethyl - 9 - azoniabicyclo[3.3.1]non-3α(or 3β)-yl α,α-di(2-thienyl)glycolate iodide or 6,6,9,9-tetramethyl-9-azoniabicyclo[3.3.1]non-3α-yl α,α-diphenylglycolate iodide at a dose of 30 mg./kg. is more than 80%. On the other hand, the protective effect of scopolamine butyl-bromide against stress-induced ulcer is about 20–40% under the same condition. Homologues of the glycolate-type compounds, wherein hydroxy radical (Y) is replaced with hydrogen or a lower alkanoyl radical, have also a potent peripheral anti-cholinergic activity. However, they are a little less active than the corresponding glycolate-type compounds.

Side effects of the compounds such as mydriasis and thirst are relatively less as compared with scopolamine butylbromide. Moreover, the compounds of the present invention are substantially free from central anti-cholinergic activity. For instance, when injected intraperitoneally to male mice at a dose of 30 mg./kg., the compounds neither show anti-tremorine activity nor anti-physostigmine activity.

The toxicity of the compounds of the present invention are considerably low. When administered orally, the acute toxicity ($LD_{50}$) of 6,6,9,9-tetramethyl - 9 - azoniabicyclo-[3.3.1]non-3α-yl α,α-di(2-thienyl)glycolate iodide is more than 2000 mg./kg.

According to the present invention, a compound of the Formula I can be prepared by reacting a tertiary amino compound of the formula:

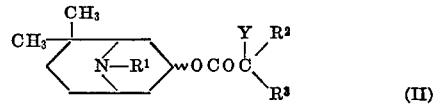

(II)

wherein $R^1$, $R^2$, $R^3$ and Y are as defined above, with a compound of the formula:

$$R^4-X \qquad (III)$$

wherein $R^4$ and X are defined as defined above.

The starting compound (II) is readily obtained. For instance, it may be produced by condensing α,α-dimethylglutaraldehyde, acetonedicarboxylic acid and lower alkylamine, reducing the resultant 6,6-dimethyl-9-lower alkyl-9-azabicyclo[3.3.1]nonan-3-one, followed by heating with a compound of the formula:

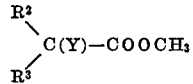

wherein $R^2$, $R^3$ and Y are as defined above, in the presence of metallic sodium.

The preferred examples of the starting compound (III) are alkyl halide (e.g., methyl iodide, ethyl iodide, butyl iodide, methyl bromide, ethyl bromide), esters of alkanesulfonic acid (e.g., methyl methanesulfonate, ethyl methanesulfonate, ethyl ethanesulfonate), esters of aromatic sulfonic acid (e.g., methyl p-toluenesulfonate, ethyl p-toluenesulfonate, methyl benzenesulfonate) and esters of sulfuric acid (e.g., dimethylsulfuric acid, diethylsulfuric acid).

The preparation of the quaternary ammonium compound (I) may be carried out by treating the compounds (II) and (III) at room temperature or under heating at 50° to 80° C. in an inert solvent. For example, acetonitrile and acetone are suitable as the reaction solvent. Alternatively, the reaction may be carried out without using such a solvent when the compound (III) is employed in an excessive amount to the compound (II). In the latter case, the compound (III) also serves as the reaction solvent. When an alkyl halide is employed as the starting compound (III), it is preferred to carry out the reaction in a sealed vessel. On the other hand, when an ester of alkanesulfonic acid or an ester of aromatic sulfonic acid is employed as the compound (III), the reaction may be preferably carried out in the presence of alkali metal iodide (e.g., potassium iodide, sodium iodide) as catalysts.

The compound (I) thus obtained may be incorporated within a pharmaceutical preparation in conjunction with or admixed with a pharmaceutical excipient that is suitable for enteral or parenteral administration. Excipients which do not react with the compound (I) should be selected. Gelatin, lactose, glucose, sodium chloride, starch, magnesium stearate, talcum, vegetable oil, benzyl alcohol and gums are suitable. Other known medicinal excipients may be employed. The pharmaceutical preparation may be, for example, a solid dosage form such as a tablet, a coated tablet, a pill or a capsule, or a liquid dosage form such as, for example, a solution, a suspension or an emulsion.

The pharmaceutical preparation may be sterilized and/or may contain auxiliaries, such as preserving, stabilizing, wetting or emulsifying agent. The pharmaceutical preparation may further contain other therapeutically valuable substances.

Practical and presently-preferred embodiments of the present invention are illustratively shown in the following examples.

EXAMPLE 1

0.9 g. of 6,6,9-trimethyl-9-azabicyclo[3.3.1]non-3α-yl α,α-diphenylglycolate is dissolved in 10 ml. of acetonitrile. 10 ml. of methyl iodide are added to the solution. The solution is allowed to stand at room temperature for 10 days in a sealed vessel. The precipitating crystals are collected by filtration and then washed with a mixture of methanol and ether. 0.69 g. of 6,6,9,9-tetramethyl-9-azoniabicyclo[3.3.1]non - 3α - yl α,α - diphenylglycolate iodide is obtained as colorless prisms. Yield: 56.2% M.P. 123–124° C. (decomp.).

*Analysis.*—Calculated for $C_{26}H_{34}NO_3I\cdot CH_3OH$ (percent): C, 57.14; H, 6.75; N, 2.47; I, 22.36. Found (percent): C, 57.46; H, 6.85; N, 2.32; I, 22.21.

EXAMPLE 2

0.9 g. of 6,6,9-trimethyl-9-azabicyclo[3.3.1]non-3β-yl α,α-diphenylglycolate is dissolved in 10 ml. of acetonitrile. 10 ml. of methyl iodide are added to the solution. The solution is allowed to stand at room temperature for 10 days in a sealed vessel. The precipitating crystals are collected by filtration and then washed with a mixture of methanol and ether. 0.64 g. of 6,6,9,9-tetramethyl-9-azoniabicyclo[3.3.1]non - 3β - yl α,α - diphenylglycolate iodide is obtained as colorless prisms. Yield: 52.2% M.P. 225–226° C. (decomp.).

*Analysis.*—Calculated for $C_{26}H_{34}NO_3I$ (percent): C, 58.31; H, 6.40; N, 2.62; I, 23.70. Found (percent): C, 58.21; H, 6.52; N, 2.61; I, 24.27.

EXAMPLE 3

9.1 g. of 6,6,9 - trimethyl - 9 - azabicyclo[3.3.1]non-3α-yl α,α-di(2 - thienyl)glycolate are dissolved in 100 ml. of acetonitrile. 100 ml. of methyl iodide are added to the solution. The solution is allowed to stand at room temperature for a month in a sealed vessel. The precipitating crystals are collected by filtration, washed with ether and then recrystallized from methanol. 9.5 g. 6,6,9,9-tetramethyl - 9 - azoniabicyclo[3.3.1]non - 3α - yl α,α-di(2-thienyl)glycolate iodide are obtained as pale orange needles. Yield: 73% M.P. 108–110° C. (decom.).

*Analysis.*—Calculated for $C_{22}H_{30}NO_3S_2I\cdot CH_3OH$ (percent: C, 47.66; H, 5.91; N, 2.42; S, 11.07; I, 21.90. Found (percent): C, 47.53; H, 5.71; N, 2.76; S, 11.56; I, 22.10.

When the crude crystals in the aforementioned procedure are recrystallized from ethanol-water (1:1) instead of recrystallizing from methanol, colorless plates are obtained. M.P. 202–203° C. (decomp.).

*Analysis.*—Calculated for $C_{22}H_{30}NO_3S_2I$ (percent): C, 48.26; H, 5.52; N, 2.56; S, 11.71; I, 23.18. Found (percent): C, 48.62; H, 5.59; N, 2.38; S, 12.10; I, 22.73.

EXAMPLE 4

9.1 g. of 6,6,9 - trimethyl - 9 - azabicyclo[3.3.1]non-3β-yl α,α-di(2 - thienyl)glycolate are dissolved in 50 ml. of acetonitrile. 50 ml. of methyl iodide are added to the solution. The solution is allowed to stand at room temperature for a month in a sealed vessel. The precipitating crystals are collected by filtration, washed with ether and then recrystallized from methanol. 10.6 g. 6,6,9,9-tetramethyl - 9 - azoniabicyclo[3.3.1]non - 3β - yl α,α-di(2-thienyl)glycolate iodide are obtained as colorless prisms. Yield: 86%. M.P. 209–210° C. (decomp.).

*Analysis.*—Calculated for $C_{22}H_{30}NO_3S_2I$ (percent): C, 48.26; H, 5.52; N, 2.56; S, 11.70; I, 23.18. Found (percent): C, 48.30; H, 5.31; N, 3.02; S, 12.07; I, 23.13.

EXAMPLE 5

0.9 g. of 6,6,9 - trimethyl - 9 - azabicyclo[3.3.1]non-3β-yl α,α-di(2-thienyl) glycolate is mixed with 10 ml. of methyl iodide. The mixture is heated at 60° C. for 14 hours in a sealed vessel. The reaction mixture is concentrated to dryness under reduced pressure. The residue thus obtained is washed with ether and then recrystallized from methanol. 0.22 g. of 6,6,9,9 - tetramethyl-9-azoniabicyclo[3.3.1]non - 3β - yl α,α - di(2 - thienyl)glycolate iodide is obtained as colorless prisms. Yield: 17.7%. M.P. 209–210° C. (decomp.).

EXAMPLE 6

0.9 g. of 6,6-dimethyl-9-n-butyl-9-azabicyclo[3.3.1]non-3α-yl α,α-diphenylglycolate is dissolved in 10 ml. of acetonitrile. 10 ml. of methyl iodide are added to the solution. The solution is allowed to stand at room temperature for 9 months in a sealed vessel. The reaction solution is concentrated to dryness under reduced pressure. The residue thus obtained is washed with ether. 0.98 g. of 6,6,9-trimethyl-9-n-butyl-9-azoniabicyclo[3.3.1]non-3α-yl α,α - diphenylglycoate iodide is obtained. Yield: 81%. Recrystallization of the product from a mixture of methanol and ether gives colorless prisms. M.P. 187–189° C. (decomp.).

*Analysis.*—Calculated for $C_{29}H_{40}NO_3I$ (percent): C, 60.30; H, 6.98; N, 2.43; I, 21.98. Found (percent): C, 59.84; H, 6.89; N, 2.90; I, 22.51.

EXAMPLE 7

1.8 g. of 6,6,9-trimethyl-9-azabicyclo[3.3.1]non-3β-yl α,α-diphenylglycolate are dissolved in 10 ml. of acetonitrile. 10 ml. of ethyl iodide are added to the solution. The solution is refluxed for 10 hours on a water bath. The reaction solution is concentrated to dryness under reduced pressure. The residue thus obtained is washed with ether. 0.2 g. of 6,6,9-trimethyl-9-ethyl-9-azoniabicyclo[3.3.1] non-3β-yl α,α-diphenylglycolate iodide are obtained. Yield: 8%. Recrystallization of the product from a mixture of methanol and ether gives colorless prisms. M.P. 220–221° C. (decomp.).

*Analysis.*—Calculated for $C_{27}H_{36}NO_3I$ (percent): C, 59.01; H, 6.60; N, 2.55; I, 23.09. Found (percent): C, 59.18; H, 6.59; N, 2.91; I, 23.59.

EXAMPLE 8

1.5 g. of 6,6,9-trimethyl-9-azabicyclo[3.3.1]non-3β-yl α,α-diphenylglycolate are dissolved in 10 ml. of acetonitrile. 1.5 g. of methyl p-toluenesulfonate and small amounts of potassium iodide are added to the solution. The solution is refluxed for 6 hours and then allowed to stand at room temperature for overnight. The precipitating crystals are collected by filtration and then washed with benzene. 0.6 g. of 6,6,9,9-tetramethyl-9-azoniabicyclo[3.3.1]non-3β-yl α,α-diphenylglycolate p-toluenesulfonate is obtained. Yield: 27.2%. Recrystallization of the product from ethanol gives colorless prisms. M.P. 230–232° C. (decomp.).

*Analysis.*—Calculated for $C_{33}N_{41}NO_6S$ (percent): C, 68.37; H, 7.13; N, 2.42; S, 5.53. Found (percent): C, 68.92; H, 7.09; N, 2.38; S, 5.57.

EXAMPLE 9

1.82 g. of 6,6,9-trimethyl-9-azabicyclo[3.3.1]non-3α-yl α,α-diphenylacetate are dissolved in 20 ml. of acetonitrile. 20 ml. of methyl iodide are added to the solution. The solution is allowed to stand at room temperature for 10 days in a sealed vessel. The precipitating crystals are collected by filtration and then recrystallized from methanol. 1.71 g. of 6,6,9,9-tetramethyl-9-azoniabicyclo[3.3.1]non-3α-yl α,α-diphenylacetate iodide are obtained as colorless prisms. Yield: 68.4%. M.P. 203–204° C. (decomp.).

*Analysis.*—Calculated for $C_{26}H_{34}NO_2I$ (percent): C, 60.11; H, 6.59; N, 2.59; I, 24.43. Found (percent): C, 60.27; H, 6.63; N, 2.64; I, 24.75.

EXAMPLE 10

1.82 g. of 6,6,9 - trimethyl - 9 - azabicyclo[3.3.1]non-3β-yl α,α-diphenylacetate are dissolved in 20 ml. of acetonitrile and 20 ml. of methyl iodide are added to the solution. The solution is allowed to stand at room temperature for 10 days in a sealed vessel. The reaction solution is concentrated to dryness under reduced pressure. The residue thus obtained is washed with ether. 1.46 g. of 6,6,9,9 - tetramethyl-9-azoniabicyclo[3.3.1]non-3β-yl α,α-diphenylacetate iodide are obtained. Yield: 58.4%. Recrystallization of the product from methanol gives colorless needles. M.P. 207–208° C. (decomp.).

*Analysis.*—Calculated for $C_{26}H_{34}NO_2I \cdot CH_3OH$ (percent): C, 58.79; H, 6.94; N, 2.54; I, 23.03. Found (percent): C, 58.75; H, 6.77; N, 2.44; I, 23.35.

EXAMPLE 11

0.56 g. of 6,6,9 - trimethyl - 9 - azabicyclo[3.3.1]non-3 - β - yl α - propionyloxy - α,α-diphenylacetate is dissolved in 10 ml. of acetonitrile. 3.5 g. of methyl iodide are added to the solution. The solution is allowed to stand at room temperaure for a month in a sealed vessel. The precipitating crystals are collected by filtration and then washed with ether. The crystals are recrystallized from 70% aqueous methanol. 0.61 g. of 6,6,9,9-tetramethyl-9 - azoniabicyclo[3.3.1]non - 3β-yl α-propionyloxy-α,α-diphenylacetate iodide is obtained as colorless prisms. Yield: 80%. M.P. 193–194° C. (decomp.).

*Analysis.*—Calculated for $C_{29}H_{38}NO_4I \cdot H_2O$ (percent): C, 56.86; H, 6.58; N, 2.29; I, 21.21. Found (percent): C, 57.29; H, 6.55; N, 2.27; I, 20.98.

EXAMPLE 12

93 mg. of 6,6,9 - trimethyl - 9 - azabicyclo[3.3.1] non-3β-yl α-butyryloxy-α,α-di(2 - thienyl)acetate are dissolved in 5 ml. of acetonitrile. 0.6 g. of methyl iodide is added to the solution. The solution is allowed to stand for a month at room temperature in a sealed vessel. A small amount of ether is added to the reaction solution, and the precipitating crystals are collected by filtration. The crystals are recrystallized from 70% aqueous methanol. 80 mg. of 6,6,9,9 - tetramethyl - 9 - azoniabicyclo[3.3.1]-non-3β-yl α - butyryloxy-α,α-di(2-thienyl)acetate iodide are obtained as colorless prisms. Yield: 64%. M.P. 208–209° C. (decomp.).

*Analysis*—Calculated for $C_{26}H_{36}NO_4S_2I \cdot H_2O$ (percent): C, 48.90; H, 6.00; N, 2.19. Found (percent): C, 49.13; H, 5.98; N, 2.61.

What we claim is:

1. A compound represented by the formula:

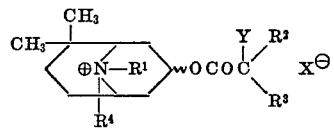

wherein $R^1$ and $R^4$ are lower alkyl, each of $R^2$ and $R^3$ is phenyl or thienyl, Y is hydroxy and X is an anionic residue of a pharmaceutically acceptable acid.

2. The compound as described in claim 1, wherein $R^1$ and $R^4$ are alkyl radicals having one to four carbon atoms.

3. The compound as described in claim 1, wherein $R^1$ and $R^4$ are methyl, and each of $R^2$ and $R^3$ is phenyl or thienyl.

4. The compound as described in claim 1, wherein $R^1$ and $R^4$ are methyl, $R^2$ and $R^3$ are 2-thienyl and X is iodide ion or p-toluenesulfonate ion.

5. The compound as described in claim 1, wherein $R^1$ and $R^4$ are methyl, $R^2$ and $R^3$ are phenyl and X is iodide ion or p-toluenesulfonate ion.

6. The compound as described in claim 1, wherein X is an anion selected from the group consisting of halide, alkanesulfonate, arylsulfonate and alkylsulfate.

7. The compound as described in claim 1, wherein X is an anion selected from the group consisting of iodide, bromide, methanesulfonate, ethanesulfonate, p-toluenesulfonate, benzenesulfonate, methylsulfate and ethylsulfate.

References Cited

UNITED STATES PATENTS

| | | | |
|---|---|---|---|
| 3,184,467 | 5/1965 | Dold et al. | 260—294.3 |
| 3,261,841 | 7/1966 | Zenitz | 260—292 |
| 3,673,195 | 6/1972 | Yoneda et al. | 260—293.54 |

HENRY R. JILES, Primary Examiner

G. T. TODD, Assistant Examiner

U.S. Cl. X.R.

424—267